US007068932B2

(12) United States Patent
Wan et al.

(10) Patent No.: US 7,068,932 B2
(45) Date of Patent: Jun. 27, 2006

(54) METHOD AND SYSTEM FOR AUTOMATIC INITIALIZATION OF AN OPTICAL NETWORK

(75) Inventors: Ping Wai Wan, Ottawa (CA); Derrick Remedios, Ottawa (CA); Eddie Kai Ho Ng, Ottawa (CA)

(73) Assignee: Tropic Networks Inc., Kanata (CA)

( * ) Notice: Subject to any disclaimer, the term of this patent is extended or adjusted under 35 U.S.C. 154(b) by 729 days.

(21) Appl. No.: 10/260,621

(22) Filed: Oct. 1, 2002

(65) Prior Publication Data
US 2004/0086274 A1    May 6, 2004

Related U.S. Application Data

(60) Provisional application No. 60/365,791, filed on Mar. 21, 2002, provisional application No. 60/365,779, filed on Mar. 21, 2002, provisional application No. 60/354,025, filed on Feb. 5, 2002, provisional application No. 60/348,612, filed on Jan. 17, 2002.

(51) Int. Cl.
*H04B 10/08* (2006.01)
*H04B 17/00* (2006.01)

(52) U.S. Cl. .......................... 398/25; 398/28; 398/151

(58) Field of Classification Search ......... 398/141–181
See application file for complete search history.

(56) References Cited

U.S. PATENT DOCUMENTS

| | | | |
|---|---|---|---|
| 5,933,552 A * | 8/1999 | Fukushima et al. | 385/24 |
| 6,219,162 B1 * | 4/2001 | Barnard et al. | 398/9 |
| 6,304,347 B1 | 10/2001 | Beine et al. | |
| 6,599,039 B1 * | 7/2003 | Nakazato | 398/25 |
| 6,816,681 B1 * | 11/2004 | Li et al. | 398/27 |
| 6,819,479 B1 * | 11/2004 | Islam et al. | 359/337 |

FOREIGN PATENT DOCUMENTS

WO    WO 01 01611 A    1/2001

OTHER PUBLICATIONS

Patent Abstracts of Japan, vol. 2000, No. 22, Mar. 9, 2001 & JP 2001 144352 A (Sumitomo Electric Ind. Ltd), May 25, 2001—abstract.

Srivastava, A.K., et al, "Optical Amplifiers for Optical Networks", Vertical-Cavity Lasers, Technologies for a Global Information Infrastructure, WDM Components Technology, Advanced Semiconductor Lasers and Applications, Gallium Nitride Materials, Processing, and Devices, 1997 Digest of the IEEE/LEOS, Summer, Topical M, Aug. 11, 1997, pp. 74-75, XP010243214, ISBN: )-7803-3891-X, the whole document.

Sugaya, Y., et al, "In-Service-Upgradable and Wide-Dynamic Range Split-Band Optical Fibre Amplifier for High-Capacity Broadband WDM Transmission Systems", Electronics Letters, IEE Stevenage, GB, vol. 35, No. 16, Aug. 5, 1999, p. 1361 1362, XP006012527, ISSN: 0013-5194, the whole document.

* cited by examiner

*Primary Examiner*—Kenneth Vanderpuye
*Assistant Examiner*—Luis Garcia
(74) *Attorney, Agent, or Firm*—Victoria Donnelly (57) ABSTRACT

A method for automatic initialization of an optical network is provided. A network management system (NMS) performs remote determination of span losses and sets the operating points of network components. The initialization method comprises remotely and automatically setting target gains of optical amplifiers and signal power levels at transmitters and receivers to required operating values. The methods for initialization of the optical network of the embodiments include gain excursion minimization (GEM) for individual channels passing through amplifiers and/or pre-emphasis of the optical link, where channel powers at the transmitters are biased to compensate for the effects of optical amplifiers gain ripple.

27 Claims, 5 Drawing Sheets

METHOD AND SYSTEM FOR AUTOMATIC INITIALIZATION OF AN OPTICAL NETWORK

RELATED APPLICATIONS

This application claims benefit of U.S. Provisional Patent Application to Ng et al, Ser. No. 60/348,612 filed on 17 Jan. 2002; and of U.S. Provisional Patent Application to Ng et al, Ser. No. 60/354,025 filed on 5 Feb. 2002; U.S. Provisional Application to Wan et al, Ser. No. 60/365,779 filed on 21 Mar. 2002; and of U.S. Provisional Patent Application to Ng et al, Ser. No. 60/365,791 filed on 21 Mar. 2002; and of U.S. Patent Application to Ng et al, Ser. No. 10/195,495 filed on 16 Jul. 2002 entitled "Method and Apparatus for Gain Excursion Minimization in Automatic Gain Controlled Optical Systems"; and is related to a U.S. patent application to Ng et al, entitled "Method and System for Multi-Level Power Management in an Optical Network", filed concurrently herewith.

FIELD OF THE INVENTION

The present invention relates generally to optical communications networks, and in particular to a method for automatic initialization of an optical network.

BACKGROUND OF THE INVENTION

Optical networks, especially metropolitan area networks (MANs), are subject to numerous upgrades and reconfigurations because of the nature of MANs to provide dynamic connections in order to service growing and changing metropolitan areas.

Currently, a typical initialization of an optical network is performed manually. This process requires slow and time-consuming on site configuration involving costly personnel and, most significantly, it is prone to human errors.

Additionally, the initialization process requires knowledge of certain network parameters, such as span losses, which include component and fiber losses between optical amplifiers. To obtain these parameters, the initialization process may depend upon specification data from the network planning phase, which is frequently obsolete by the time of actual deployment. Differences between the specified values and actual values of the network parameters introduce errors into the initialization and operation of the optical network. Manual determination of the required network parameters could eliminate such errors, but would require on site assessment of the network making the process slow and costly.

U.S. Pat. No. 6,304,347 to Beine et al. issued Oct. 16, 2001 and entitled "Optical Power Management in an Optical Network" discloses a system for managing an optical network such that selected power characteristics in the network are achieved by configuring optical amplifiers and/or variable optical attenuators within the nodes of a network. The focus of the system is to manage the power characteristics of the nodes of a protected network during switching events. To this end, Switching and Wavelength Manager Modules may provide switching and wavelength management information to each node, or the nodes may exchange information between themselves to distribute management information to perform the switching and maintain the power characteristics. The patent also discloses that as part of the managing process, a Power Management Module may determine power parameters at the input and output edges of a card and store these power parameters in a parameter table. Each of the modules described in U.S. Pat. No. 6,304,347 requires additional logic, communications connections, and memory for parameter tables. In summary, methods described in this patent are specific to protected networks, which undergo switching events that change the configuration of the optical network. As a result, they require re-configuring of nodes of the network until the optical network has the selected power characteristics, which is complicated and time-consuming.

Therefore, there is a need in industry for the development of alternative solutions for automatic initialization of an optical network that would be simple, expeditious, cost-efficient, and would provide required operating conditions for the optical network.

SUMMARY OF THE INVENTION

Therefore there is an object of the invention to provide a method for automatic initialization of an optical network that would avoid or minimize the drawbacks of the existing methods.

According to one aspect of the invention, there is provided a method for automatic initialization of an optical link in an optical network, comprising the steps of:

(a) determining a span loss of each fiber span in the link;

(b) setting a target gain of each amplifier in the link based on the span losses of the fiber spans in the link;

(c) selecting an optical channel to be transmitted through the link and turning on the channel power;

(d) setting a signal power level at a transmitter for said channel on the link so that to provide transmittance of said channel through the link while the channel is amplified by the amplifier in the link;

(e) setting a signal power level at a receiver for said channel on the link so as to provide that the power level at the receiver is within a predetermined range;

(f) repeating the steps (c) to (e) until all channels to be transmitted through the link are selected.

The method described above has been implemented in the first embodiment of the invention.

The step (d) of setting the signal power level at the transmitter may comprise setting the attenuation of an attenuator at the transmitter and the step (e) of setting the signal power level at the receiver may comprise setting the attenuation of an attenuator at the receiver.

Additionally the step (d) of setting the signal power level at the transmitter may comprise setting the signal power level at the transmitter to be substantially equal to one of the following:

the maximum power $P_{Tx\ max}$ of the transmitter, if the loss $L_0$ of the fiber span located between the transmitter and the optical amplifier nearest to the transmitter (a first fiber span) is greater than or equal to a minimum span loss $L_{min}$ specified for the network; and $P_{Tx\ max} - L_{min} + L_0$, if the loss $L_0$ of said first fiber span is less than the minimum span loss $L_{min}$.

Also, the step (e) of setting the signal power level at the receiver may comprise setting the signal power level at the receiver to be substantially equal to $P_{RX\ max} - P_{margin}$, wherein $P_{margin}$ is a specified power margin for the channel and $P_{RX\ max}$ is a maximum specified channel power to the receiver.

Furthermore, the step (b) of setting the target gain of each amplifier may comprise setting the target gain so as to provide that the power at the output of each amplifier is substantially equal to a maximum specified power $P_{max}$ for a channel in the optical network.

Specifically, the step of setting the target gain of each amplifier may comprise the steps of:

setting a target gain $G_1$ of the optical amplifier nearest to the transmitter to be substantially equal to the following value:

$$G_1 = (P_{max} - P_{Tx}) + L_0$$

wherein $P_{max}$ is the maximum specified power for a channel in the optical network, and $P_{Tx}$ is an average power of the transmitters in the link; and setting a target gain $G_i$ of each of the remaining amplifiers in the link to be substantially equal to the loss $L_i$ of the fiber span following each of said amplifiers.

If desired, the step (e) of setting the signal power level at the receiver may further comprise the steps of:

(g) decreasing the signal power level at the receiver for said channel to the level below a signal detection limit of the receiver;

(h) increasing the signal power level at the receiver for said channel until it reaches the signal detection limit of the receiver;

(j) storing said signal power level at the receiver from the step (h); and (k) calculating a operating power margin for said channel as being equal to the difference between the signal power level at the receiver in the step (e) and in the step (j), the steps (g), (h), and (j) being performed before the step (e).

In the method of the second embodiment of the invention the step (c) further comprises dynamically regulating the target gain of each amplifier in the link.

The step of dynamically regulating target gain may comprise:

regulating the target gain of each amplifier so as to provide that the gain for each optical channel passing through the amplifier is within a gain ripple $\Delta$ of the amplifier, the gain ripple $\Delta$ being a variation of the amplifier gain profile with channel wavelength.

In the method of the third embodiment of the invention, the method of the first embodiment further comprises the step of adjusting the signal power levels at the transmitters in the link so as to provide that the variation in power for different channels transmitted through the link is opposite to the cumulative gain ripple of the amplifiers in the link, the cumulative gain ripple of the amplifiers being a variation of the amplifiers cumulative gain profile with channel wavelength.

Additionally, the step (a) of determining the span loss of all embodiments of the invention may comprise determining the span loss of each fiber span in the link remotely.

The step of remotely determining the span loss may comprise:

(i) selecting a channel on the optical link and turning on the channel power at the corresponding transmitter;

(ii) increasing the power at said transmitter until the signal power level at the amplifier nearest to said transmitter reaches a predetermined power level;

(iii) varying a target gain of said amplifier until the signal power level at the network element nearest to the amplifier reaches said predetermined power level;

(iv) repeating the step (iii) until the signal power level at all network elements on the optical link reaches the same said predetermined power level;

(v) determining the span loss of each fiber span as being equal to the following value:

the difference between the power at the transmitter in the step (ii) and said predetermined power level, if the fiber span is located between said transmitter and the optical amplifier nearest to the transmitter; and the target gain of the amplifier immediately preceding the fiber span, the target gain being set in the step (iii), if the fiber span is any of the remaining spans of fiber.

The step (ii) of increasing the power at said transmitter may comprise decreasing the attenuation of an attenuator at said transmitter.

Additionally, the step (ii) of increasing the power at said transmitter may comprise increasing the power until the signal power level at the amplifier nearest to said transmitter reaches the predetermined power level defined as the minimum specified input power of the amplifier or the average specified input power of the amplifier.

In a modification to the embodiments of the invention, the step of remotely determining the span loss comprises:

determining a signal power level at an input of a fiber span in the optical link;

determining a signal power level at an output of the fiber span in the optical link; and determining the loss for the fiber span to be equal to the difference between said signal power level at the input of the fiber span and said signal power level at the output of the fiber span.

According to another aspect of the invention, there is provided a method for automatic initialization of an optical network having a plurality of optical links, comprising the steps of:

(l) selecting an optical link;

(m) initializing said link according to the previous aspect of the invention; and (n) repeating the steps (l) to (m) until all links from the plurality of links in the network are initialized.

The step (a) of selecting an optical link may comprise selecting the optical link so as to optimize the initialization of the optical network. Additionally, the step of selecting an optical link may comprise selecting the longest optical link in the optical network.

In the method of the second embodiment the step (c) further comprises dynamically regulating the target gain of each amplifier in the link.

The step of dynamically regulating target gain may comprise:

regulating the target gain of each amplifier so as to provide that the gain for each optical channel passing through the amplifier is within a gain ripple $\Delta$ of the amplifier, the gain ripple $\Delta$ being a variation of the amplifier gain profile with channel wavelength.

In the method of the third embodiment the step (m) of initializing the link further comprises the step of adjusting the signal power levels at the transmitters in the link so as to provide that the variation in power for different channels transmitted through the link is opposite to the cumulative gain ripple of the amplifiers in the link, the cumulative gain ripple of the amplifiers being a variation of the amplifiers cumulative gain profile with channel wavelength.

Additionally, the step (a) of determining the span loss may comprise determining the span loss of each fiber span in the link remotely.

The step of remotely determining the span loss may comprise:

(i) selecting a channel on the optical link and turning on the channel power at the corresponding transmitter;

(ii) increasing the power at said transmitter until the signal power level at the amplifier nearest to said transmitter reaches a predetermined power level;

(iii) varying a target gain of said amplifier until the signal power level at the network element nearest to the amplifier reaches said predetermined power level;

(iv) repeating the step (c) until the signal power level at all network elements on the optical link reaches the same said predetermined power level;

(v) determining the span loss of each fiber span as being equal to the following value:

the difference between the power at the transmitter in the step (ii) and said predetermined power level, if the fiber span is located between said transmitter and the optical amplifier nearest to the transmitter; and the target gain of the amplifier immediately preceding the fiber span, the target gain being set in the step (iii), if the fiber span is any of the remaining spans of fiber.

In yet another modification to the embodiments of the invention, the step of remotely determining the span loss comprises:

determining a signal power level at an input of a fiber span in the optical link;

determining a signal power level at an output of the fiber span in the optical link; and determining the loss for the fiber span to be equal to the difference between said signal power level at the input of the fiber span and said signal power level at the output of the fiber span.

According to yet another aspect of the invention, there is provided a system for automatic initialization of an optical link in an optical network, comprising:

(a) means for determining a span loss of each fiber span in the link;

(b) means for setting a target gain of each amplifier in the link based on the span losses of the fiber spans in the link;

(c) means for selecting an optical channel to be transmitted through the link and turning on the channel power;

(d) means for setting a signal power level at a transmitter for said channel on the link so that to provide transmittance of said channel through the link while the channel is amplified by the amplifier in the link;

(e) means for setting a signal power level at a receiver for said channel on the link so as to provide that the power level at the receiver is within a predetermined range;

(f) means for repeating the steps (c) to (e) until all channels to be transmitted through the link are selected.

According to one more aspect of the invention, there is provided a system for automatic initialization of an optical network having a plurality of optical links, comprising:

(l) means for selecting an optical link;

(m) the system for automatic initialization of the optical link as described above; and (n) means for repeating the steps (l) to (m) until all links from the plurality of links in the network are initialized.

The methods for initialization of an optical network of the embodiments of the invention provide simple and cost-efficient initialization of an optical network while monitoring the health of the network and optionally supporting dynamic adding and dropping of multiple channels.

BRIEF DESCRIPTION OF THE DRAWINGS

Embodiments of the invention will now be described, by way of example, with reference to the accompanying drawings in which.

DETAILED DESCRIPTION OF PREFERRED EMBODIMENTS

Figure 1:
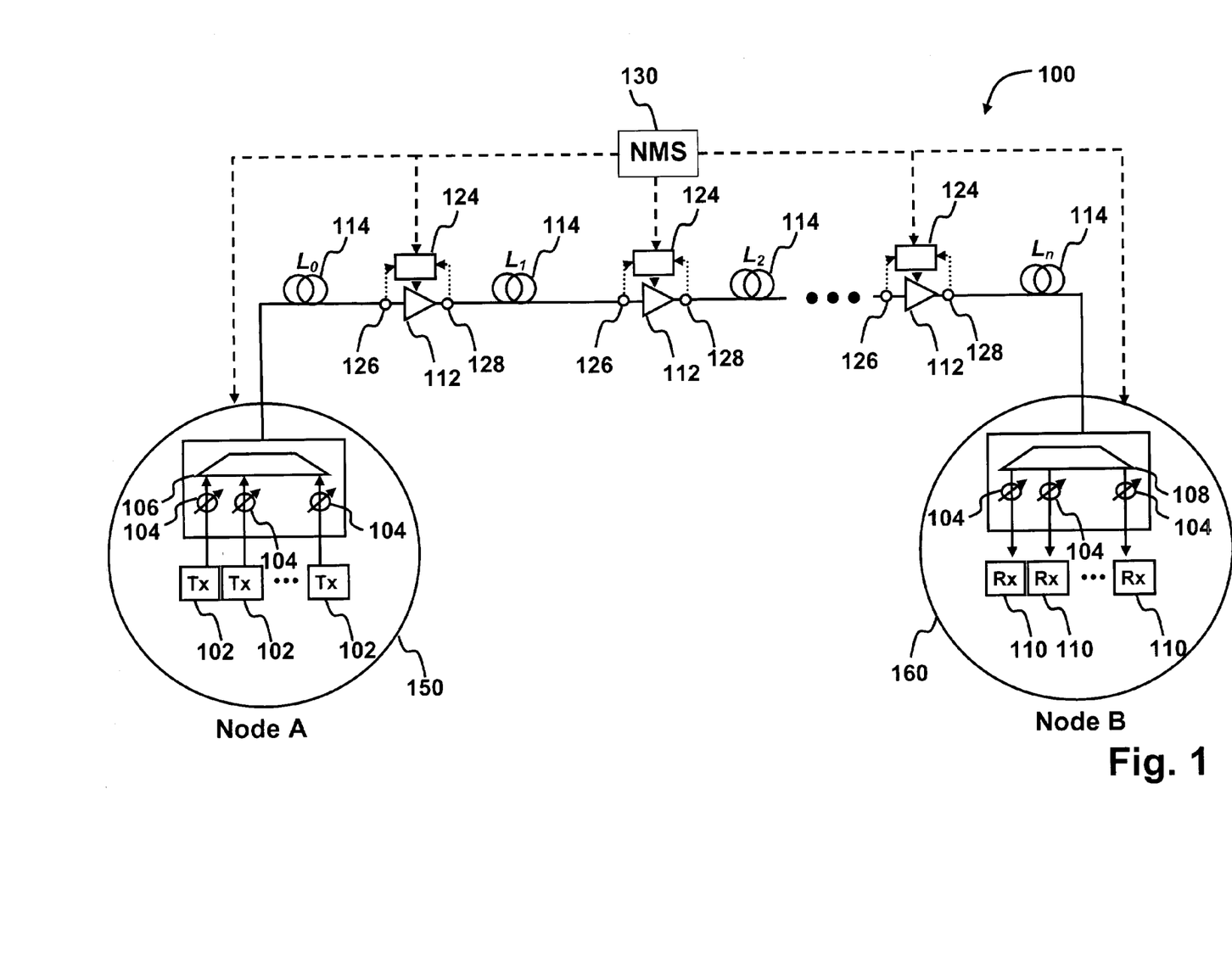
FIG. 1 is an exemplary optical network used for illustrating methods for initialization of an optical network according to embodiments of the invention.

An exemplary optical network 100, implemented in the form of one optical link connecting node "A" 150 to node "B" 160, used for illustrating a method for initialization of an optical network according to embodiments of the invention, is shown in FIG. 1. Node "A" 150 comprises a number of transmitters 102 with optical attenuators 104 at their outputs, transmitting signals that are combined by a multiplexer 106. Node "B" 160 comprises corresponding receivers 110 with optical attenuators 104 at their inputs, and a demultiplexer 108 separating the combined signal received from Node "A" 150. The optical link is composed of a chain of optical amplifiers 112 having automatic gain control (AGC) linked by spans of fiber 114.

A network management system (NMS) 130 includes means for performing automatic initialization of the optical network 100 and is connected to each of the optical amplifiers 112 and other network elements, such as optical attenuators 106, channel power monitors 126 and 128, transmitters 102 and receivers 110. The connections are either direct or indirect and are represented by dashed lines in FIG. 1.

The optical network 100 in FIG. 1 also has a feedback control loop employed on each optical amplifier 112 comprising input and output channel power monitors, 126 and 128, located at the input and output of each optical amplifier 112, and a controller 124 connected to the optical amplifier 112 and the channel power monitors 126 and 128. The connections are represented by dotted lines in FIG. 1.

As is known in the art, optical networks can include an arbitrary number of optical amplifiers 112, transmitters 102, and receivers 110, the transmitters 102 and receivers 110 being located together or at different points in the optical network from one another. Also, the feedback control loop mentioned above may be an optional component. Accordingly, FIG. 1 serves merely to illustrate one form of optical network for the purpose of describing the embodiment of the invention.

The network 100 is initialized in the following manner. The NMS 130 initializes the optical network by determining fiber span losses and setting the operating points of the network components according to the methods of the embodiments of the invention as will be described in detail below.

The feedback control loop for the amplifier provides additional optimization of the network in the form of gain excursion minimization (GEM) by dynamically regulating the target gain of the amplifier, if additional power margin is required. Also, the NMS 130 may provide pre-emphasis control of the link, in which channel powers at the transmitters are biased to compensate for the effects of optical amplifier gain ripple.

Figure 2:
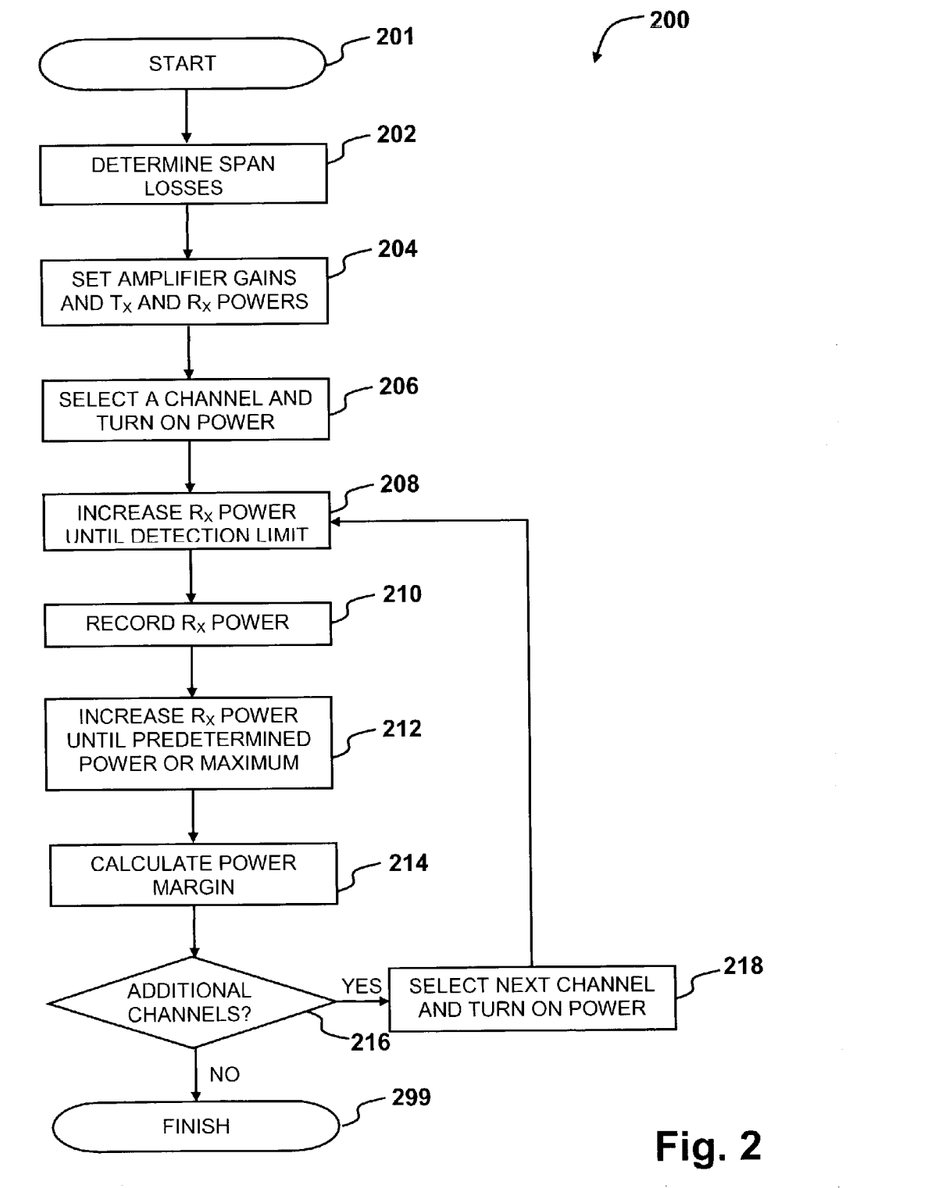
FIG. 2 is a flowchart illustrating the steps of the method for initialization of an optical network according to the first embodiment of the invention.

FIG. 2 is a flowchart 200 illustrating the steps of the method for initialization of an optical link in the optical network 100 according to the first embodiment of the invention. The initialization method is performed on one optical link at a time, wherein each optical link is a path of a channel from one of the transmitters 102 on Node "A" 150 to one of the corresponding receivers 110 on Node "B" 160. The optical network 100 illustrated in FIG. 1 has a single optical link as was mentioned above.

Upon start 201, the procedure 200 performed by the NMS 130 determines the span loss of each fiber span 114 in the optical link (step 202). Remote, automatic methods of determining the span loss will be described in detail below.

In the step 204 of FIG. 2, the procedure 200 performed by the NMS 130 sets the target gain of each optical amplifier 112 and the signal power level at each transmitter 102 ($T_x$) and receiver 110 ($R_x$).

The signal power level at each transmitter 102 is set to be substantially equal to its maximum power $P_{Tx\ max}$ by, for example, setting the attenuation $L_{Tx}$ of an optical attenuator at the transmitter to about zero attenuation. However, if the loss $L_0$ of the fiber span located between the transmitter 102 and the nearest optical amplifier is less than the minimum span loss $L_{min}$ specified for the network, the attenuation $L_{Tx}$ of the optical attenuator at the transmitter is set to be substantially equal to the following value:

$$L_{Tx} = L_{min} - L_0$$

so that the power at the transmitter is substantially equal to $P_{Tx\ max} - L_{min} + L_0$.

The target gain $G_1$ of the optical amplifier nearest to the transmitter is set to the following value:

$$G_1 = (P_{max} - P_{Tx}) + L_0$$

where $P_{max}$ is the maximum specified power for a channel in the optical network, and $P_{Tx}$ is the average power of the transmitters 102 in the link. The target gain $G_i$ of each of the remaining optical amplifiers is set to substantially compensate for the span loss $L_i$ of the fiber span following each optical amplifier. This provides that the network operates at a desirable power level with the maximum specified power for a channel $P_{max}$ present at the output of each optical amplifier 112 in the network.

The signal power level at each receiver 110 is set to a level below the signal detection limit of the receiver. This is accomplished by, for example, setting the attenuation of an optical attenuator at the receiver to maximum attenuation.

After performing the step 204 of setting the target gain of each optical amplifier 112 and the signal power level at each transmitter 102 ($T_x$) and receiver 110 ($R_x$), the procedure 200 performed by the NMS 130 selects and turns on channel power to a channel on the optical link (step 206).

In the step 208 of FIG. 2, the procedure 200 performed by the NMS 130 increases the signal power level at the receiver on the channel being optimized until the power level reaches the signal detection limit of the receiver. The channel power at the receiver ($R_x$) is stored in the step 210 of FIG. 2 for later use.

In the step 212 of FIG. 2, the procedure 200 performed by the NMS 130 increases the signal power level at the receiver on the channel being optimized until it is within a predetermined range or, if this is not possible, until the maximum power is reached. The signal power level may be set to, for example, a specified power margin $P_{margin}$ for each channel subtracted from the maximum specified channel power $P_{Rx\ max}$ to the receiver.

In the step 214 of FIG. 2, the procedure 200 performed by the NMS 130 calculates the operating power margin of the channel as being equal to the difference between the signal power levels at the receiver in the step 212 and in the step 210. The operating power margin is monitored to protect the network, such as by guarding against receiver damage due to power overload.

In the step 216 of FIG. 2, the procedure 200 performed by the NMS 130 checks if there are additional channels on the optical link to be initialized. If there are additional channels, then the procedure 200 selects and turns on the channel power to the next channel to be initialized (step 218) and the steps 208 to 214 are repeated. If there are no additional channels, the procedure of link initialization is finished 299 for the current optical link.

Figure 3:
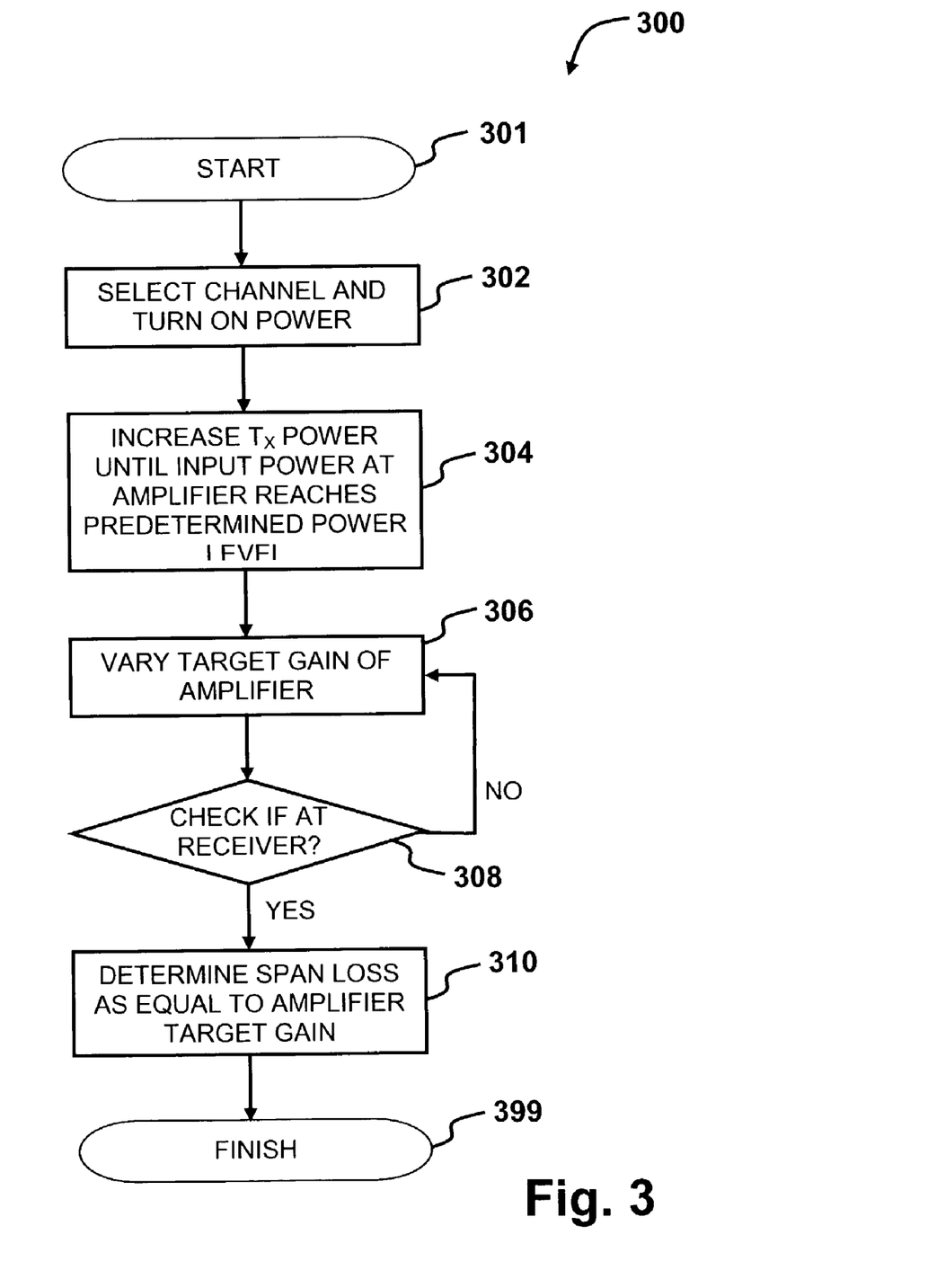
FIG. 3 is a flowchart illustrating the step 202 of automatically determining the span losses of an optical network in the method of FIG. 2 in more detail.

The step 202 of determining the span loss of each fiber span in the optical link is described in more detail with reference to FIG. 3. FIG. 3 is a flowchart 300 illustrating the step 202 of automatically determining the span losses of an optical network in the method of FIG. 2 in more detail.

Upon start 301, the procedure 300 performed by the NMS 130 selects a channel on the optical link and turns on channel power at the corresponding transmitter (step 302).

In the step 304 of FIG. 3, the procedure 300 performed by the NMS 130 increases the power at the transmitter until the power level at the nearest optical amplifier achieves a predetermined power level. The predetermined power level may be, for example, the minimum specified input power of the optical amplifier or the average specified input power of the optical amplifier. The predetermined power level is achieved by, for example, decreasing the attenuation of the attenuator, such as a variable optical attenuator (VOA), located at the output of the transmitter.

In the step 306 of FIG. 3, the procedure 300 performed by the NMS 130 varies the amplification of the optical amplifier identified in the previous step until the signal power level at the network element nearest to the amplifier, e.g., either another optical amplifier or a receiver, achieves the same predetermined power level.

In the step 308 of FIG. 3, the procedure 300 performed by the NMS 130 checks whether the next network element is a receiver, signifying the end of the optical link. If the next network element is not a receiver, then the step 306 is repeated until the signal power levels at all network elements on the optical link reach the same predetermined power level.

If the next network element is a receiver 110, the procedure 300 performed by the NMS 130 proceeds to the step 310.

In the step 310 of FIG. 3, the procedure 300 performed by the NMS 130 determines span losses for each fiber span 114. The span loss $L_0$ of the fiber span located between the transmitter and the optical amplifier nearest to the transmitter is the difference between the power at the transmitter, as measured by a channel power monitor at the transmitter, and the predetermined power level mentioned above. The span loss of any of the remaining fiber spans in the link is determined to be equal to the target gain of the amplifier 112 immediately preceding the fiber span 114. With the determination of the span losses for each fiber span in the link, the procedure 300 is finished (step 399).

The procedure may be performed twice with the selected channels being, for example, the channel with the highest loss and then the channel with the lowest loss. This would provide minimum and maximum span losses for each fiber span.

Thus, a method for initialization of an optical link in an optical network is provided that is simple, universal, requires limited component hardware and consequently low component cost. Additionally, it tracks the operating power margin of the channels on the link in the network to monitor the health of the network. As well, the initialization method includes a method for determining the span losses of an optical link that is accurate and is performed automatically. The initialization method is repeated for each optical link in the optical network.

Figure 4:
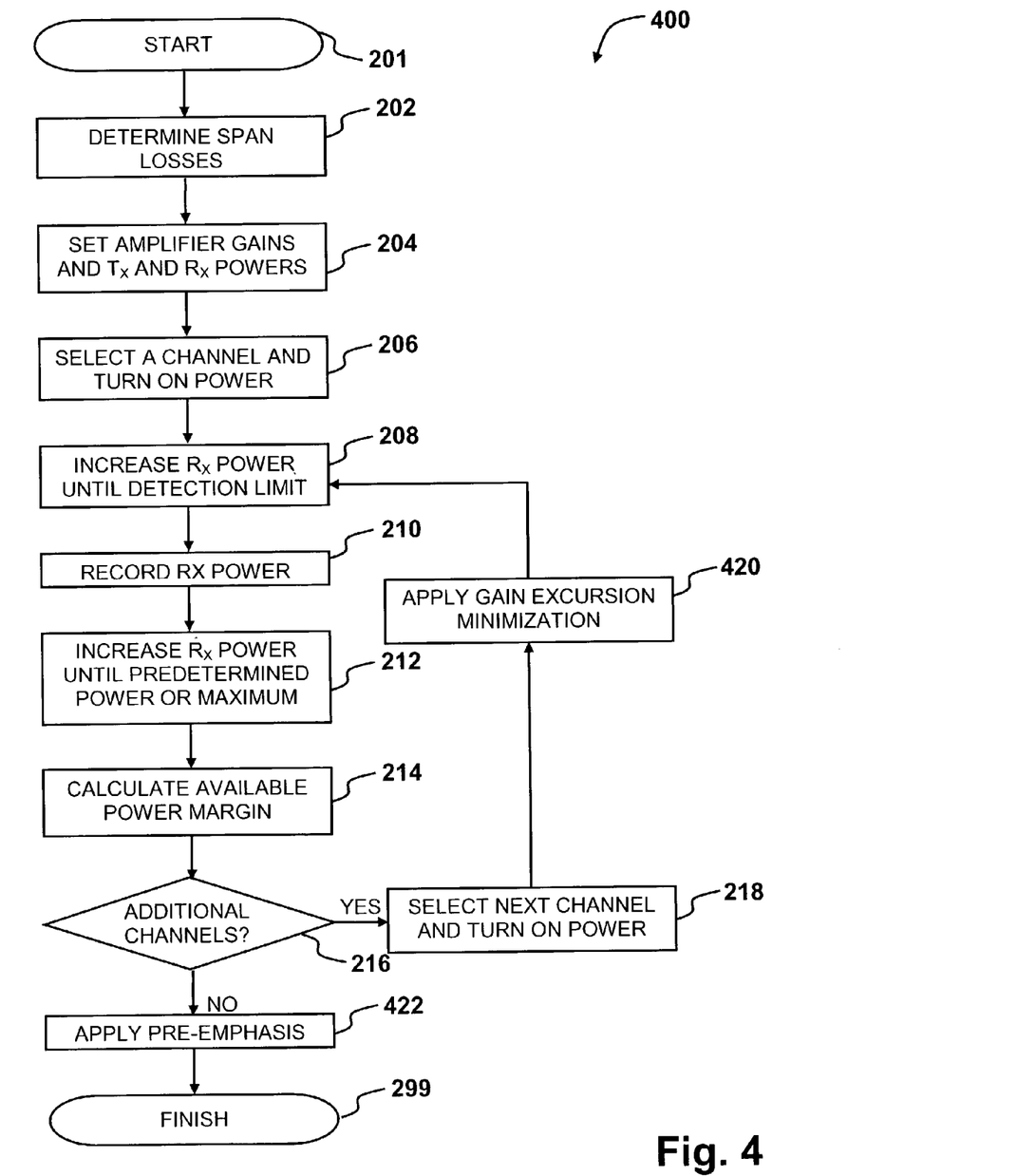
FIG. 4 is a flowchart illustrating the steps of a method for initialization of an optical network according to the second and third embodiments of the invention.

FIG. 4 shows a flowchart 400 illustrating the steps of the methods for initialization of an optical network according to the second and third embodiments of the invention. The methods of the second and third embodiments are similar to the first embodiment except for additional steps being added, namely the step 420 of applying gain excursion minimization (GEM) to each amplifier and the step 422 of applying pre-emphasis to the optical link. The same steps in flowcharts 200 and 400 are designated by the same reference numerals in FIG. 2 and FIG. 4.

According to the second embodiment of the invention, the step 420 of FIG. 4 is applied after the step 218 in which the procedure 400 selects and turns on channel power to the next channel to be initialized. In the step 420 of FIG. 4, the procedure 400 performed by the NMS 130 applies gain excursion minimization (GEM) to the amplifiers 112 in the link in the following manner. The input and output channel powers are measured by the input and output channel power monitors 126 and 128 respectively to determine channel gains, which are the ratios of the output to input channel powers. The feedback control loop on each amplifier 112 dynamically supplies the automatic gain controlled amplifier 112 with a target gain calculated by the controller 124 to minimize or eliminate channel gain excursion. The target gain is calculated by the controller 124 according to the methods detailed in U.S. Pat. No. 10/195,495 to Ng et al. filed Jul. 16, 2002 and entitled "Method and Apparatus for Gain Excursion Minimization in Automatic Gain Controlled Optical Systems".

Thus, a method for initialization of an optical link in an optical network is provided that is additionally enhanced by gain excursion minimization so that dynamic adding and dropping of multiple channels is supported.

According to the third embodiment of the invention, the step 422 of FIG. 4 is added after all channels on the optical link have been initialized. In the step 422 of FIG. 4, the procedure 400 performed by the NMS 130 determines the power variation for different channels due to cumulative gain ripple of the amplifiers in the optical link and adjusts the signal power levels at the transmitters and/or the attenuations of attenuators at the transmitters so that the power variation at the transmitters is opposite to the cumulative gain ripple of the amplifiers in the link, the cumulative gain ripple being a variation of the amplifiers cumulative gain profile with channel wavelength. This adjusting of signal power levels to compensate for the effects of amplifier gain ripple is referred to as pre-emphasis and it minimizes the deleterious effects of power variation on the optical link. It may be implemented by, for example, adjusting the signal power levels of the channels so that they are substantially equal in value upon reaching the middle of the optical link. The adjustment of the signal power levels of the channels is performed under the condition that the signal power levels remain within the operating power margin of the channel as calculated in the step 214 of FIG. 2.

Thus, a method for initialization of an optical link in an optical network is provided that minimizes the effects of amplifier gain ripple.

In a modification to the methods of the embodiments described above, the step 202 of the procedure 200 of FIG. 2 of determining a span loss may be performed so that to measure channel power at both the input and output of each optical amplifier 112 in the optical link. The modification to the step 202 comprises determining the input and output signal power level of each optical amplifier 112 using the channel power monitors 126 and 128 and calculating the difference between the signal power level at the output of each fiber span (i.e. input to an amplifier) and the signal power level at the input of each fiber span (i.e. output of preceding amplifier). This difference in input and output signal power levels is the span loss of the fiber span.

In another modification to the step 202 of the procedure 200 of FIG. 2, the determining of span loss may comprise retrieving previously calculated span loss from the NMS 130. Exemplary optical networks used for illustrating this modification are illustrated in FIG. 5 and in FIG. 6.

Figure 5:
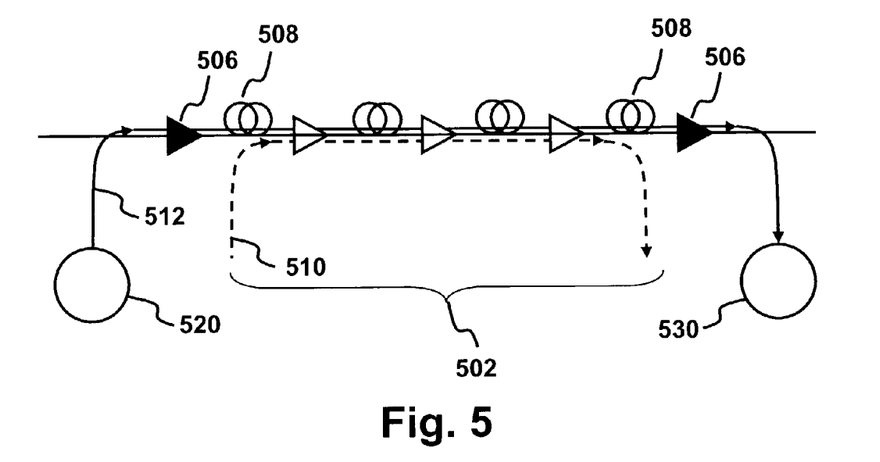
FIG. 5 is another exemplary optical network used for illustrating a modification to the step 202 of determining the span losses in the methods according to embodiments of the invention.

Referring to FIG. 5, an optical network 502, which is similar to the network 100 of FIG. 1, is expanded to include additional amplifiers 506 and fiber spans 508 at a source 520 and/or destination 530 position of the network. The optical link 512 (represented by a solid line), for which span losses need to be determined, includes an optical link 510 (represented by a dashed line) for which the losses are already known. Accordingly, the loss of each existing fiber span in the network 502 does not need to be recalculated as it is already stored in the NMS 130 and needs only to be retrieved. Thus only the loss of each new fiber span 508 needs to be calculated according to the method described above.

Figure 6:
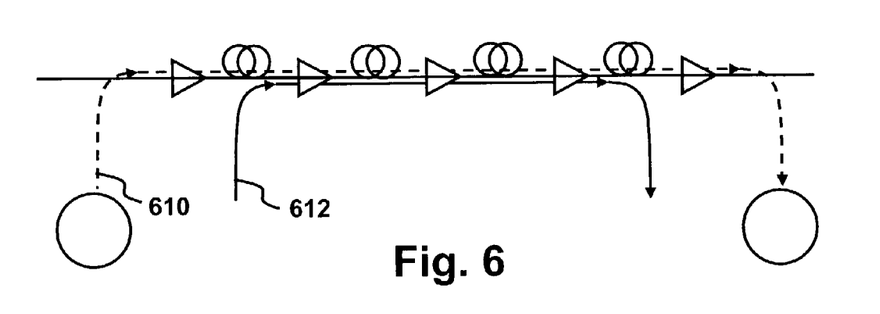
FIG. 6 is yet another exemplary optical network used for illustrating another modification to the step 202 of determining the span losses in the methods according to embodiments of the invention.

Referring to FIG. 6, the initialization method is performed on one optical link at a time and it may occur that a link 612 (represented by a solid line) for which span losses need to be determined is a subset of an optical link 610 having a higher number of spans (represented by a dashed line) whose losses have already been determined. In such an instance, the span loss of each fiber span in the link 612 is already stored in the NMS 130 and needs only to be retrieved.

From the modifications described above, it is clear that the order in which optical links are initialized and brought to the required operating points in the optical network may be optimized well. For example, it is beneficial to initialize optical links, each having a number of fiber spans in the order of decreasing number of spans, so that the method for determining span losses on subsequent optical links may claim benefit from the span losses already stored in the NMS 130.

It is apparent to those skilled in the art that there are many variations of the present invention that retain the spirit of the invention. Thus it is intended that the present invention covers the modifications, variations, and adaptations of this invention provided they fall within the scope of the following claims.

What is claimed is:

1. A method for automatic initialization of an optical link in an optical network, comprising the steps of:
    (a) determining a span loss of each fiber span in the link;
    (b) setting a target gain of each amplifier in the link based on the span losses of the fiber spans in the link;
    (c) selecting an optical channel to be transmitted through the link and turning on the channel power;

(d) setting a signal power level at a transmitter for said channel on the link so that to provide transmittance of said channel through the link while the channel is amplified by the amplifier in the link;

(e) setting a signal power level at a receiver for said channel on the link so as to provide that the power level at a receiver is within a predetermined range, comprising:

(g) decreasing the signal power level at the receiver for said channel to the level below a signal detection limit of the receiver;

(h) increasing the signal power level at the receiver for said channel until it reaches the signal detection limit of the receiver;

(j) storing said signal power level at the receiver from the step (h); and (k) calculating an operating power margin for said channel as being equal to a difference between the signal power level at the receiver in the step (e) and in the step (j), the steps (g), (h), and (j) being performed before the step (e); and (f) repeating the steps (c) to (e) until all channels to be transmitted through the link are selected.

2. A method as claimed in claim 1 wherein the step (d) of setting the signal power level at the transmitter comprises setting an attenuation of an attenuator at the transmitter.

3. A method as claimed in claim 1 wherein the step (e) of setting the signal power level at the receiver comprises setting an attenuation of an attenuator at the receiver.

4. A method as claimed in claim 1 wherein the step (d) of setting the signal power level at the transmitter comprises setting the signal power level at the transmitter to be substantially equal to one of the following:

the maximum power $P_{Tx\,max}$ of the transmitter, if a loss $L_0$ of the fiber span located between the transmitter and the optical amplifier nearest to the transmitter (a first fiber span) is greater than or equal to a minimum span loss $L_{min}$ specified for the network; and $P_{Tx\,max}-L_{min}+L_0$, if the loss $L_0$ of said first fiber span is less than the minimum span loss $L_{min}$.

5. A claim as claimed in claim 1 wherein the step (b) of setting the target gain of each amplifier comprises setting the target gain so as to provide that a power at the output of each amplifier is substantially equal to a maximum specified power $P_{max}$ for a channel in the optical network.

6. A method as claimed in claim 1 wherein the step (e) of setting the signal power level at the receiver comprises setting the signal power level at the receiver to be substantially equal to $P_{RX\,max}-P_{margin}$, wherein $P_{margin}$ is a specified power margin for the channel and $P_{RX\,max}$ is a maximum specified channel power to the receiver.

7. A method as claimed in claim 5 wherein the step of setting the target gain of each amplifier comprises the steps of:

setting a target gain $G_1$ of the optical amplifier nearest to the transmitter to be substantially equal to the following value:

$$G_1=(P_{max}-P_{Tx})+L_0$$

wherein $P_{max}$ is the maximum specified power for a channel in the optical network, and $P_{Tx}$ is an average power of the transmitters in the link; and setting a target gain $G_i$ of each of the remaining amplifiers in the link to be substantially equal to a loss $L_i$ of the fiber span following each of said amplifiers.

8. A method as claimed in claim 1 wherein the step (c) further comprises dynamically regulating the target gain of each amplifier in the link.

9. A method as claimed in claim 8 wherein the step of dynamically regulating target gain comprises:

regulating the target gain of each amplifier so as to provide that the gain for each optical channel passing through the amplifier is within a gain ripple $\Delta$ of the amplifier, the gain ripple $\Delta$ being a variation of an amplifier gain profile with channel wavelength.

10. A method as claimed in claim 1 further comprising the step of adjusting the signal power levels at the transmitters in the link so as to provide that a variation in power for different channels transmitted through the link is opposite to a cumulative gain ripple of the amplifiers in the link, the Cumulative gain ripple of the amplifiers being a variation of the amplifiers cumulative gain profile with channel wavelength.

11. A method as claimed in claim 1 wherein the step (a) of determining the span loss comprises determining the span loss of each fiber span in the link remotely.

12. A method as claimed in claim 11 wherein the step of remotely determining the span loss comprises:

(i) selecting a channel on the optical link and turning on the channel power at the corresponding transmitter;

(ii) increasing the power at said transmitter until the signal power level at the amplifier nearest to said transmitter reaches a predetermined power level;

(iii) varying a target gain of said amplifier until the signal power level at a network element nearest to the amplifier reaches said predetermined power level;

(iv) repeating the step (iii) until the signal power level at all network elements on the optical link reaches the same said predetermined power level;

(v) determining the span loss of each fiber span as being equal to the following value:

a difference between the power at the transmitter in the step (ii) and said predetermined power level, if the fiber span is located between said transmitter and the optical amplifier nearest to the transmitter; and the target gain of the amplifier immediately preceding the fiber span, the target gain being set in the step (iii), if the fiber span is any of the remaining spans of fiber.

13. A method as claimed in claim 12 wherein the step (ii) of increasing the power at said transmitter comprises decreasing an attenuation of an attenuator at said transmitter.

14. A method as claimed in claim 12 wherein the step (ii) of increasing the power at said transmitter comprises increasing the power until the signal power level at the amplifier nearest to said transmitter reaches the predetermined power level defined as a minimum specified input power of the amplifier.

15. A method as claimed in claim 12 wherein the step (ii) of increasing the power at said transmitter comprises increasing the power until the signal power level at the amplifier nearest to said transmitter reaches the predetermined power level defined as an average specified input power of the amplifier.

16. A method as claimed in claim 11 wherein the step of remotely determining the span loss comprises:

determining a signal power level at an input of a fiber span in the optical link;

determining a signal power level at an output of the fiber span in the optical link; and determining the loss for the fiber span to be equal to a difference between said signal power level at the input of the fiber span and said signal power level at the output of the fiber span.

17. A method for automatic initialization of an optical network having a plurality of optical links, comprising the steps of:
(l) selecting an optical link;
(m) initializing said link according to the method of claim 1; and
(n) repeating the steps (l) to (m) until all links from the plurality of links in the network are initialized.

18. A method as claimed in claim 17 wherein the Step (l) of selecting an optical link comprises selecting the optical link so as to optimize the initialization of the optical network.

19. A method as claimed in claim 18 wherein the step of selecting the optical link comprises selecting the optical link having a highest number of fiber spans among the remaining links to be initialized in the network.

20. A method as claimed in claim 17 wherein the step (c) further comprises dynamically regulating the target gain of each amplifier in the link.

21. A method as claimed in claim 20 wherein the step of dynamically regulating target gain Comprises:
regulating the target gain of each amplifier so as to provide that the gain for each optical channel passing through the amplifier is within a gain ripple $\Delta$ of the amplifier, the gain ripple $\Delta$ being a variation of the amplifier gain profile with channel wavelength.

22. A method as claimed in claim 17 wherein the step (m) of initializing the link further comprises the step of adjusting the signal power levels at the transmitters in the link so as to provide that the variation in power for different channels transmitted through the link is opposite to a cumulative gain ripple of the amplifiers in the link, the cumulative gain ripple of the amplifiers being a variation of the amplifiers cumulative gain profile with channel wavelength.

23. A method as claimed in claim 17 wherein the step (a) of determining the span loss comprises determining the span loss of each fiber span in the link remotely.

24. A method as claimed in claim 23 wherein the step of remotely determining the span loss comprises:
(i) selecting a channel on the optical link and turning on the channel power at the corresponding transmitter;
(ii) increasing the power at said transmitter until the signal power level at the amplifier nearest to said transmitter reaches a predetermined power level;
(iii) varying a target gain of said amplifier until the signal power level at a network element nearest to the amplifier reaches said predetermined power level;
(iv) repeating the step (c) until the signal power level at all network elements on the optical link reaches the same said predetermined power level;
(v) determining the span loss of each fiber span as being equal to the following value:
a difference between the power at the transmitter in the step (ii) and said predetermined power level, if the fiber span is located between said transmitter and the optical amplifier nearest to the transmitter; and
the target gain of the amplifier immediately preceding the fiber span, the target gain being set in the step (iii), if the fiber span is any of the remaining spans of fiber.

25. A method as claimed in claim 23 wherein the step of remotely determining the span loss comprises:
determining a signal power level at an input of a fiber span in the optical link;
determining a signal power level at an output of the fiber span in the optical link; and
determining the loss for the fiber span to be equal to a difference between said signal power level at the input of the fiber span and said signal power level at the output of the fiber span.

26. A system for automatic initialization of an optical link in an optical network, comprising:
(a) means for determining a span loss of each fiber span in the link;
(b) means for setting a target gain of each amplifier in the link based on the span losses of the fiber spans in the link;
(c) means for selecting an optical channel to be transmitted through the link and turning on the channel power;
(d) means for setting a signal power level at a transmitter for said channel on the link so as to provide transmittance of said channel through the link while the channel is amplified by the amplifier in the link;
(e) means for setting a signal power level at a receiver for said channel on the link so as to provide that the power level at the receiver is within a predetermined range, comprising:
(g) means for decreasing the signal power level at the receiver for said channel to the level below a signal detection limit of the receiver;
(h) means for increasing the signal power level at the receiver for said channel until it reaches a signal detection limit of the receiver;
(j) means for storing said signal power level at the receiver from the step (h); and
(k) means for calculating an operating power margin for said channel as being equal to a difference between the signal power level at the receiver in the step (e) and in the step (j), the steps (g), (h), and (j) being performed before the step (e); and
(f) means for repeating the steps (c) to (e) until all channels to be transmitted through the link are selected.

27. A system for automatic initialization of an optical network having a plurality of optical links, comprising:
(l) means for selecting an optical link;
(m) the system for automatic initialization of the optical link as described in claim 26; and
(n) means for repeating the steps (l) to (m) until all links from the plurality of links in the network are initialized.

* * * * *